INVENTOR.
Harold N. Eagleton

Jan. 19, 1965     H. N. EAGLETON     3,166,094
RECEIVING VALVE

Filed Jan. 8, 1962                                                 2 Sheets-Sheet 2

INVENTOR.
Harold N. Eagleton
BY
William S. Dorman
ATTORNEY

United States Patent Office 3,166,094
Patented Jan. 19, 1965

3,166,094
RECEIVING VALVE
Harold N. Eagleton, Colorado Springs, Colo., assignor to Charles Wheatley Company, Tulsa, Okla., a corporation of Oklahoma
Filed Jan. 8, 1962, Ser. No. 164,943
4 Claims. (Cl. 137—544)

This invention relates to improvements in valve structures and more particularly, but not by way of limitation, to a valve particularly designed and constructed to be interposed in a pipe line for receiving pipe line pigs, or the like, at the desired location of removal thereof from a pipe line or gathering system.

It is common practice today to move pipe line pigs, or spheroids, through a pipe line for many purposes. For example, it is often desirable to inject a pig into a pipe line for separating two different products being transported through the same pipe line in sequence. In other instances, pigs or spheriods may be moved through a pipe line for cleaning the interior thereof, or for removing trapped liquid deposits therein and forcing the liquid through the pipe. Of course, it is necessary to remove the pigs from the pipe line or gathering system subsequent to the passage thereof through the system, or upon the completion of the desired results with the pig. It may be desirable to remove the pig at the end of a pipe line section, or it may be preferred to remove the pig at some other point along the trunk lines, such as at the location wherein the products moving through the line are to be separated, or wherein it is desired to inject a larger pig or spheriod and remove the smaller spheroid.

A gate valve is normally utilized in present day installations for receiving the pigs at the desired point of removal from the pipe line. The gate valve is usually interposed in the pipe line with a T member disposed upstream thereof for directing the pig into the valve and shunting the fluid in a diverse direction therefrom. The T member is normally provided with a plurality of bars, or the like, therein for guiding the pig into the check valve and precluding accidental movement of the pig along with the fluid. Furthermore, it is frequently necessary to provide reducer fitting members in cooperation with a plurality of relatively small L members in order that the installation may be aligned with adjacent equipment. Not only are these additional fittings expensive, but the use of a check valve is found to be disadvantageous in that sediment may collect in the body of the valve and cause seating problems in the closing of the valve.

The present invention contemplates a novel receiving valve adapted to be interposed at substantially any desired location in a pipe line or gathering system for receiving the pipe line pigs or spheroids therefrom. The novel valve may be disposed in the pipe line without any additional fitting members, thus providing a more economical and efficient installation. The receiving valve is particularly designed to substantially eliminate any accumulation of sediment therein, and to assure an efficient catching or receiving of the pig with a simultaneous diversion of the fluid moving therewith. The novel valve is a normally open valve which may be closed for effectively sealing off the pipe line pressure from the receiving barrel when it is desired to remove the accumulated or captured pigs from the receiving barrel. The receiving valve is simple and efficient in operation and economical and durable in construction.

It is an important object of this invention to provide a receiving valve for pipe line pigs which may be interposed at substantially any desired location in the pipe line for efficiently receiving the pigs therefrom.

It is another object of this invention to provide a receiving valve for pipe line spheroids which may be installed in the pipe line without the utilization of additional fittings and with a minimum number of connection members.

Another object of this invention is to provide a receiving valve for pipe line spheroids wherein the accumulation of sediment and the like is substantially eliminated in the body of the valve for increasing the sealing efficiency thereof.

Still another object of this invention is to provide a receiving valve for pipe line spheroids wherein the flow of the fluid therethrough is efficiently diversed from the movement of the spheroid for facilitating the capturing of the spheroid.

It is a further object of this invention to provide a novel receiving valve for pipe line spheroids and having a normal open position for facilitating the receiving of the spheroids.

It is a still further object of this invention to provide a novel receiving valve for pipe line spheroids which efficiently seals off the pipe line pressure in the closed position thereof for facilitating the removal of the captured spheroids from the receiving barrel, or the like.

Other objects and advantages of the invention will be evident from the following detailed description, read in conjunction with the accompanying drawings, which illustrate my invention.

Figure 1:
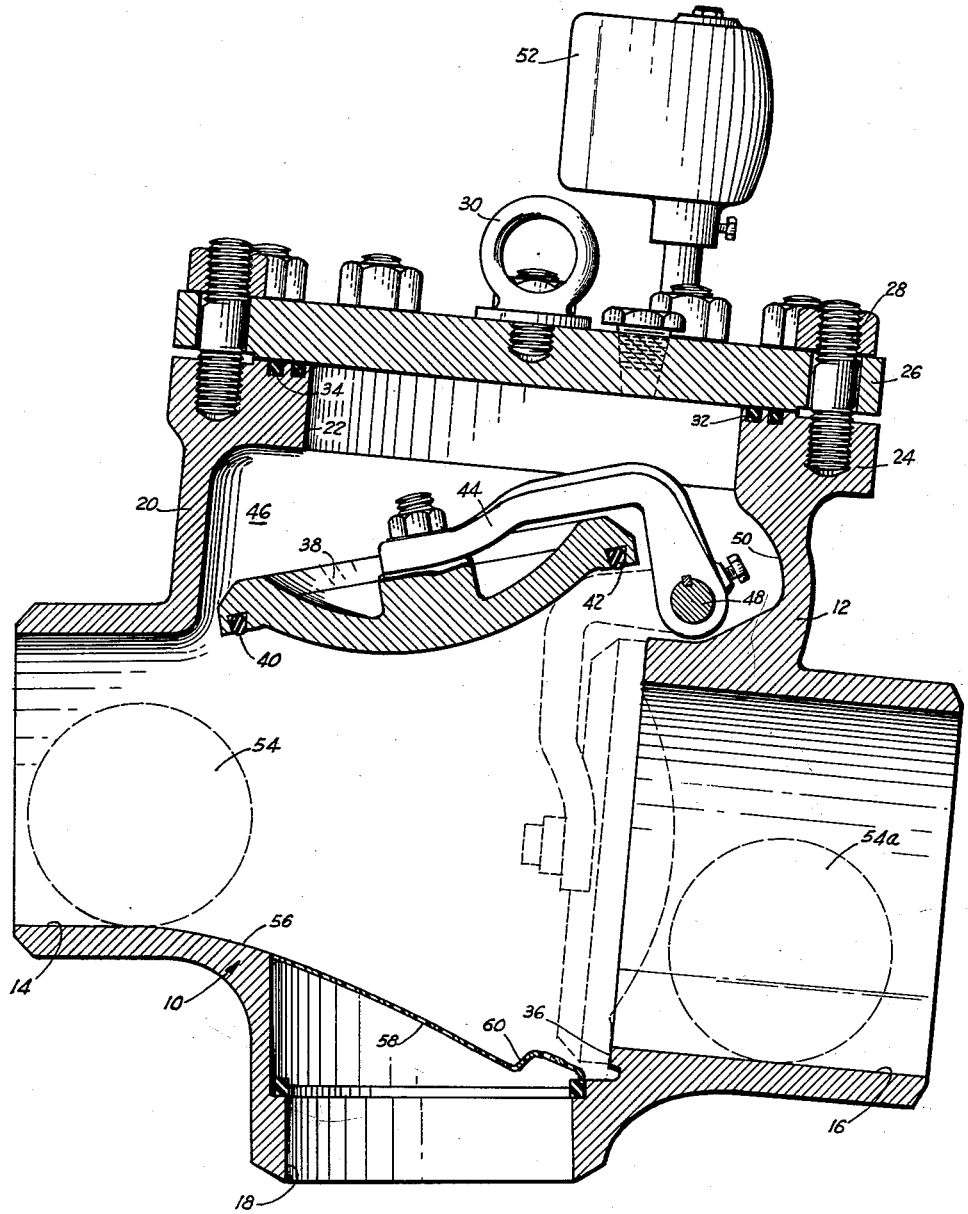
FIGURE 1 is a sectional elevational view of a receiving valve embodying the invention with portions depicted in dotted lines for purposes of illustration.

Referring to the drawings in detail, reference character 10 generally indicates a receiving valve comprising a body 12 having an inlet bore 14 and an opposed outlet bore 16. The bore 16 is preferably slightly angularly disposed with respect to the bore 14 for a purpose as will be hereinafter set forth. The body 12 is further provided with a fluid outlet bore 18 interposed between the bores 14 and 16 and preferably substantially perpendicularly disposed with respect to the bore 14, but not limited thereto. An upwardly extending neck or sleeve portion 20 is provided on the body 12 oppositely disposed from the fluid outlet bore 18 to provide an access port 22 for the interior of the body 12. The sleeve 20 is preferably provided with an outwardly extending circumferential flange 24 for supporting a cover plate 26 which may be secured thereto by a plurality of spaced bolts 28, as is well known. The cover plate may be provided with a centrally disposed gripping member 30 for facilitating removal thereof when it is desired to open the access port 22 for any reason, and it is preferable to interpose a plurality of concentric sealing rings 32 and 34 between the body 12 and the cover 26 for precluding leakage of fluid therebetween.

An annular valve seat 36 is provided in the body 12 conterminous with the inner end of the outlet bore 16 for cooperation with a pivotal clapper member 38 to intermittently close the bore 16 for a purpose as will be hereinafter set forth. The clapper 38 is provided with an annular groove 40, preferably of a dovetail type cross sectional configuration, for receiving a sealing ring 42 to provide a sealing of the bore 16 in the closed position of the clapper 38 thereagainst, as shown in dotted lines in FIG. 1. The clapper 38 may be pivotally secured within the body 12 in any suitable manner. As depicted herein, the clapper 38 may be provided with an angled shank member 44 oppositely disposed from the groove 40 and seal ring 42 for journalling the clapper within the body 12. The neck portion 20 provides an inner chamber 46 for receiving the clapper 38 in the normally opened position thereof, as shown in solid lines in FIG. 1. A transverse shaft 48 is journalled in the chamber 46 in any suitable manner, and the shank 44 is keyed or otherwise secured thereon for rotation simultaneously therewith. The chamber 46 may be provided with a recess 50 to provide clearance for the shank 44 whereby the clapper 38 may be freely rotated with the body 12.

It is preferable that at least one end (not shown) of the shaft 48 extends outwardly from the side wall of the body 12 for connection with an actuator lever or arm 52. The lever 52 may be either manually or automatically actuated, as desired. It is to be noted that while the clapper 38 may be freely rotated simultaneously with the shaft 48, the clapper is retained or securely held in the open position thereof until such time as it is desired to close the outlet bore 16, as will be hereinafter set forth. The lever 52 may be of any suitable or well known type of valve actuator. It will be apparent that rotation of the lever 52 in a counterclockwise direction, as viewed in FIG. 1, will rotate the shaft 48 in a direction for closing the clapper 38 against the valve seat 36, whereas rotation of the arm 52 in a clockwise direction will move the clapper to the raised or open position shown in solid lines.

The outlet bore 16 may be of a slightly larger diameter than the inlet bore 14 for facilitating the passage of the pigs or spheroids 54, shown in dotted lines in FIG. 1, therethrough. As hereinbefore set forth, the bore 16 is preferably disposed at an angle with respect to the bore 14 whereby the spheroids 54 entering the bore 16 will fall therethrough by gravity. Furthermore, it will be noted in FIG. 1 that the inner periphery of the bore 14 is slightly flared or angularly disposed at 56 in a direction toward the bore 16 for facilitating the passage of the spheroids 54 from the bore 14 into the bore 16. In addition, a grate or perforate plate member 58 is disposed over the inner end of the fluid outlet 18 for spanning thereof to preclude the passage of the spheroids 54 through the bore 18. It is preferable to provide a shoulder 60 on the plate 58 in order to direct the moving spheroid 54 over the grate or plate 58 and into the bore 16, as will be hereinafter set forth. It will be apparent that the grate 58 permits the flow of fluid therethrough for discharge through the fluid outlet bore 18 with relatively little interference therewith.

Figure 2:
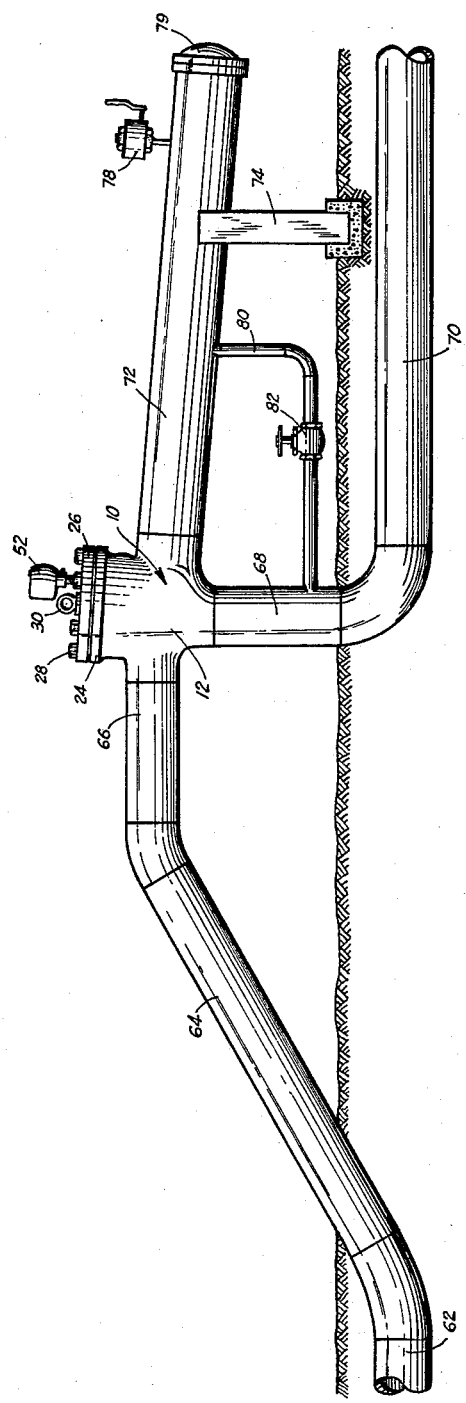
FIGURE 2 is a side elevational view of a pipe line installation including a receiving valve embodying the invention.

The valve 10 may be interposed in substantially any pipe line gathering system, such as the pipe line indicated at 62 in FIG. 2. The pipe line may be disposed above the ground, or buried therein as shown in the drawings. It is preferable to provide an angularly disposed pipe section 64 extending upwardly from the pipe line 62 into connection with a substantially horizontally disposed pipe section 66. The valve 10 is preferably secured to the pipe section 66 in any suitable manner, such as by welding, or the like, but not limited thereto, whereby the inlet bore 14 is in communication with the pipe section 66. A vertical pipe section 68 is welded, or otherwise secured, to the body 12 whereby the fluid outlet bore 18 is in communication therewith, and the pipe 68 extends downwardly into connection with the next succeeding pipe section 70 of the gathering system. A receiving tube or barrel 72 is secured to the body 12 by welding, or the like, whereby the outlet bore 16 is in communication therewith. The barrel 72 is preferably disposed at an angle with respect to the horizontal, as clearly shown in FIG. 2, and may be supported by a suitable support member 74, as is well known. An end closure member 79 of any well known type is provided on the outer end of the barrel 72, and a suitable blow down valve 78 is interposed in the barrel 72 spaced slightly from the end closure member 79.

A by-pass line or conduit 80 extends from the pipe section 68 to the barrel 72 to provide communication between the interior of the pipe line and the barrel for equalizing the pressures therein. A suitable valve 82 is interposed in the line 80 for intermittently closing off the line 80 for precluding communication of the pipe line pressure to the interior of the barrel 72 when it is desired to open the end closure 79 for access to the barrel. The clapper member 38 may be moved to a position adjacent the valve seat 36 for sealing off the outlet bore 16 to preclude leakage of the pressure from the valve body 12 to the barrel 72, and the blow down valve 78 is opened for relieving the pressure contained in the barrel 72 prior to the opening of the end closure member 79.

*Operation*

The receiving valve 10 may be interposed in the pipe line 62 at substantially any desired position in a gathering system wherein it is desired to remove pipe line pigs or spheroids 54 therefrom. The spheroids 54 are normally moved through the pipe line 62 by fluid pressure and enter the valve body 12 through the inlet bore 14, as shown in dotted lines in FIG. 1. The fluid in the pipe line 62 also enters the valve body 12 through the inlet bore 14 and is discharged therefrom by gravity through the grate 58 and fluid outlet bore 18. The fluid discharged from the fluid outlet bore 18 falls through the pipe section 68 and is directed into the pipe section 70 for continued flow through the gathering system.

As hereinbefore set forth, the clapper 38 is normally held or locked in an open position as shown in solid lines in FIG. 1. Thus, the spheroid 54 moves toward the outlet bore 16 by gravity and rolls over the grate 58, which precludes accidental discharge of the spheroid through the fluid outlet bore 18. The spheroid 54 moving through the body 12 strikes the shoulder 60 which raises the spheroid slightly for facilitating passage thereof into the outlet bore 16 to the position shown in dotted lines at 54a. The spheroid will then roll into the receiving barrel 72 and toward the end closure member 79 by gravity for storage therein. It will be apparent that a plurality of spheroids may be stored in the barrel 72 before it is necessary to remove them therefrom.

When it is desired to remove the spheroids 54 from the barrel, it is desirable to isolate the barrel from the pipe line pressure. The clapper 38 may be moved by the lever arm 52 to a position against the valve seat 36. The seal ring 42 efficiently seals the bore 16 for precluding leakage of fluid from the valve body 12 into the barrel 72. The valve 82 is closed to seal off the fluid pressure from the pipe section 68 and the blow down valve 78 may then be opened for relieving the pressure contained within the barrel 72. Subsequent to the relieving of the pressure in the barrel, the end closure member 79 may be opened whereby the spheroids may be removed from the barrel. In order to receive additional spheroids in the barrel, the end closure member 79 may be securely locked on the barrel, and the valve 82 may be opened to permit the flow of fluid pressure from the pipe section 68 into the barrel 72 for equalizing the pressures on the opposite sides of the clapper 38. The clapper 38 may then be easily opened for permitting the receiving of spheroids 54 in the barrel 72 as hereinbefore set forth.

It is to be noted that the valve 10 may also be utilized as a launching valve for injecting spheroids into the pipe line. In this type of installation, the receiving barrel 72 may be disposed at an upwardly inclined angle from the valve 10 for storing the spheroids prior to the launching thereof. The clapper 38 may be maintained in a normally closed position and opened only when it is desired to admit a spheroid into the pipe line, it being understood that any suitable stop means, such as that shown in my co-pending application Serial No. 168,599 entitled "Sphere Launching Apparatus" may be provided in the valve 10 for limiting the launching operation to a single spheroid at a time. It is also preferable in the launching installation that the valve 10 be interposed in the pipe line in such a manner that the flow of fluid therethrough is reversed from that heretofore set forth, but not limited thereto. In this manner, the force of the fluid leaving the valve 10 through the port 14 will carry the spheroid into the pipe line for launching thereof.

From the foregoing, it will be apparent that the present invention provides a novel valve for receiving pipe line pigs at the desired point of removal thereof from a pipe line or gathering system. The novel valve is a three-way type valve which substantially eliminates the necessity of interposing additional fittings in the pipe line, and efficiently directs the spheroids into a receiving barrel for storage thereof. The novel receiving valve efficiently diverts the flow of the fluid moving through the pipe line and precludes accidental discharge of the spheroids with the fluid. The novel receiving valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A receiving valve for pipe line pigs in a high pressure fluid system and comprising a body having opposed inlet and outlet bores for passing a pig therethrough, said inlet and outlet bores disposed in aligned angular positions to provide an inclined passageway for facilitating movement of the pigs through the valve, a second outlet interposed between the inlet and outlet ports for discharging fluid from the body independently of the pigs, perforated means provided in the body for precluding discharge of the pigs through the second outlet, a valve seating portion provided in the body conterminous with the outlet bore, a clapper member disposed within the body and pivotally secured in the proximity of the valve seating portion and upstream thereof to provide alternate open and closed positions for the valve, sealing means carried by the clapper member to preclude leakage of fluid through the outlet bore in the closed position of the valve, said clapper member being retained in a normally open position during a receiving operation to permit passage of a plurality of successive pigs through the outlet bore, shoulder means spaced upstream from the valve seat for directing the pigs into the outlet bore without interference from the valve seat, and means operably connected with the clapper to selectively open and close the valve whereby the valve may be closed subsequent to the passage of successive pigs to facilitate removal of the plurality of pigs having moved through the valve.

2. A receiving valve for pipe line pigs in a high pressure fluid system and comprising a body having opposed inlet and outlet bores providing an inclined passageway for the pigs moving through the valve, a pivotal clapper member provided in the body and in a normally open position for passing a plurality of pigs therethrough, a valve seat provided in the body downstream from the clapper and conterminous with the outlet bore for cooperating with the clapper in a closed position thereof for precluding leakage of fluid through the outlet bore for facilitating removal of the plurality of pigs having moved through the valve, said body provided with a fluid outlet bore for discharging fluid from the body independently of the pig, means spaced upstream from the valve seat for directing the pig through the outlet bore without interference from the valve seat, and means provided in the body for precluding discharge of the pig through the fluid outlet bore with the fluid.

3. A receiving valve for pipe line spheroids in a high pressure fluid system and comprising a body having an inlet bore for receiving a spheroid, a clapper pivotally secured in the body and having a normally open position to permit the passage of a plurality of successive spheroids through the valve, said body provided with an outlet bore oppositely disposed from the inlet bore for discharging the spheroid from the body in the open position of the clapper, said outlet bore being angularly disposed with respect to the inlet bore to provide an inclined passageway for facilitating passing of the spheroids through the valve, a valve seat provided in the body downstream from the clapper and conterminous with the outlet bore for cooperating with the clapper in the closed position thereof for precluding leakage of fluid through the outlet bore, said body provided with a fluid outlet bore interposed between the inlet and outlet bores for discharging fluid from the body independently of the spheroid, and perforate means provided in the body for precluding discharge of the spheroid with the fluid and for facilitating passage of the spheroid through the body, and means provided upstream from the valve seat for directing the spheroid into the outlet bore without interference from the valve seat.

4. A receiving valve for pipe line spheroids in a high pressure fluid system and comprising a body having opposed inlet and outlet bores, said outlet bore disposed at an angle with respect to the inlet bore to provide an inclined passageway for spheroids passing through the valve, a valve seat provided in the body conterminous with the outlet bore, a clapper member pivotally secured in the body adjacent the valve seat and upstream with respect thereto for intermittently sealing the outlet bore, means operably connected with the clapper for pivoting thereof and maintaining a normally open position for the valve during a receiving operation, said body provided with a fluid outlet bore interposed between the inlet and outlet bores for discharging fluid from the body independently of the spheroid, inclined perforate means provided in the body adjacent the fluid outlet bore for precluding passage of the spheroid therethrough, and shoulder means provided on the perforate means upstream from the valve seat for facilitating passage of the spheroid through the valve body for discharge through the outlet bore without interference from the valve seat.

References Cited by the Examiner

UNITED STATES PATENTS

| 742,515 | 10/03 | Stoddard | 243—25 |
|---|---|---|---|
| 891,324 | 6/08 | Burton | 243—23 |
| 944,487 | 12/09 | Jennings | 243—23 |
| 1,052,554 | 2/13 | Ames | 243—25 |
| 1,181,584 | 5/16 | Emerson | 243—27 |
| 2,589,170 | 3/52 | Ver Nooy | 15—104.06 |
| 2,818,592 | 1/58 | Scaramucci | 15—104.06 |
| 2,965,125 | 12/60 | Osborne et al. | 137—268 |
| 2,977,616 | 4/61 | Willis | 15—104.06 |
| 2,977,617 | 4/61 | Willis | 15—104.06 |

MARTIN P. SCHWADRON, *Acting Primary Examiner.*

ISADOR WEIL, *Examiner.*